United States Patent
Thiruvidan et al.

(10) Patent No.: US 9,189,480 B2
(45) Date of Patent: Nov. 17, 2015

(54) SMART CONTENT FEEDS FOR DOCUMENT COLLABORATION

(71) Applicant: Hewlett-Packard Development Company, L.P., Fort Collins, CO (US)

(72) Inventors: Eniyan Thiruvidan, Bangalore (IN); Anjaneyulu Kuchibhotla, Bangalore (IN); Dilip Mysore Devaraj, Bangalore (IN)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 133 days.

(21) Appl. No.: 13/782,367

(22) Filed: Mar. 1, 2013

(65) Prior Publication Data
US 2014/0250058 A1    Sep. 4, 2014

(51) Int. Cl.
*G06F 17/30*    (2006.01)
*G06Q 10/10*    (2012.01)

(52) U.S. Cl.
CPC .......... *G06F 17/30011* (2013.01); *G06Q 10/10* (2013.01)

(58) Field of Classification Search
USPC ........................ 707/608, 694, 706, 802–803
See application file for complete search history.

(56) References Cited

U.S. PATENT DOCUMENTS

| | | | |
|---|---|---|---|
| 6,751,612 B1 | 6/2004 | Schuetze et al. | |
| 7,809,697 B1 * | 10/2010 | Kanefsky et al. | 707/693 |
| 7,876,335 B1 * | 1/2011 | Pittenger et al. | 345/629 |
| 8,046,383 B2 * | 10/2011 | Weber et al. | 707/802 |
| 8,069,182 B2 * | 11/2011 | Pieper | 707/769 |
| 8,224,832 B2 | 7/2012 | Kemp et al. | |
| 8,239,413 B2 * | 8/2012 | Hubert | 707/791 |
| 8,239,754 B1 * | 8/2012 | Orthlieb | 715/232 |
| 8,589,349 B2 * | 11/2013 | Grant | 707/638 |
| 8,627,403 B1 * | 1/2014 | Kirshenbaum et al. | 726/1 |
| 8,676,735 B1 * | 3/2014 | Heidenreich et al. | 706/45 |
| 8,700,414 B2 * | 4/2014 | Rothermel et al. | 705/1.1 |
| 9,020,885 B2 * | 4/2015 | Beartusk | 707/608 |
| 2003/0145209 A1 * | 7/2003 | Eagle et al. | 713/179 |
| 2004/0128616 A1 * | 7/2004 | Kraft | 715/513 |
| 2006/0143558 A1 * | 6/2006 | Albornoz et al. | 715/512 |
| 2007/0033410 A1 * | 2/2007 | Eagle et al. | 713/176 |
| 2008/0072132 A1 * | 3/2008 | Moraveji et al. | 715/203 |
| 2008/0243807 A1 | 10/2008 | Gaucas et al. | |

(Continued)

OTHER PUBLICATIONS

Michael Prospero, Microsoft Office 2013 Preview: More Cloud, More Social, So-so Touch, Jul. 16, 2012, Retrieved from Internet Mar. 1, 2013, http://blog.laptopmag.com/microsoft-office-2013-preview-more-cloud-more-social-so-so-touch.

(Continued)

*Primary Examiner* — Hanh Thai
(74) *Attorney, Agent, or Firm* — Hewlett-Packard Patent Department (57) ABSTRACT

Example embodiments relate to smart content feeds for document collaboration. In example embodiments, a user may use a system to perform a search of a document repository in order to identify related content for adding to a target document. In response to a user approving the related content identified in the search, the system may create a reference data entry that includes a timestamp and a storage location of a source document that contains the related content. The system may then use the timestamp to detect that a modification of the source document has occurred and generate a notification for the user that describes the modification.

12 Claims, 7 Drawing Sheets

(56) References Cited

U.S. PATENT DOCUMENTS

| | | | |
|---|---|---|---|
| 2008/0263022 A1* | 10/2008 | Kostorizos et al. | 707/5 |
| 2009/0292987 A1* | 11/2009 | Sorenson | 715/255 |
| 2010/0076954 A1* | 3/2010 | Dulitz et al. | 707/709 |
| 2010/0158254 A1* | 6/2010 | Schaad et al. | 380/282 |
| 2010/0229126 A1* | 9/2010 | Mihara et al. | 715/841 |
| 2010/0241943 A1* | 9/2010 | Massand | 715/227 |
| 2011/0173222 A1* | 7/2011 | Sayal | 707/769 |
| 2011/0213655 A1* | 9/2011 | Henkin | 705/14.49 |
| 2011/0296291 A1* | 12/2011 | Melkinov et al. | 715/229 |
| 2012/0151316 A1* | 6/2012 | Massand | 715/212 |
| 2013/0024418 A1* | 1/2013 | Sitrick | 707/608 |
| 2013/0339297 A1* | 12/2013 | Chen | 707/624 |
| 2013/0339319 A1* | 12/2013 | Woodward | 707/692 |

OTHER PUBLICATIONS

Peter Mollins, Legal Document Management, Oct. 25, 2011, Retrieved from Internet Mar. 1, 2013, https://www.knowledgetree.com/blog/2011/10/2/legal-document-management.

* cited by examiner

SMART CONTENT FEEDS FOR DOCUMENT COLLABORATION

BACKGROUND

In some scenarios, a user may desire to share documents with other users via a network to collaborate. For example, the user may upload a document to a document management system so that other users can review the document. Other services also exist to enable collaboration and document sharing between users. In another example, users may create document shares and then expose the document shares to a selected set of users. The users may search the document management system or document shares to identify content related to a current project. Typically, the user that owns a document designates who may access the document, and the access to the documents is limited by permissions specified by the user.

BRIEF DESCRIPTION OF THE DRAWINGS

The following detailed description references the drawings, wherein.

DETAILED DESCRIPTION

As detailed above, document management systems enable users to share documents with each other. For example, suppose that after a user shares a document with a co-worker to facilitate collaboration, the co-worker copies content from the shared document into another document. In this example, the chain of collaboration between the users is broken by the co-worker after the content is copied. To address this issue, the user may search the document management system to identify related documents that should be linked (e.g., versioning, tagging, co-locating, etc.) back to his shared document. The co-worker may also manually link the new document to the user's shared document in the document management system.

Various document management systems may be used to facilitate collaboration between users. For example, a web portal may enable users to share and check out documents for editing, where user information for the web portal is obtained from a directory service provided by a directory server. In this manner, the user base of the web portal may be restricted to the employees of a particular company or even further to the members of a particular group within a company that have access to an enterprise local area network. In this example, a user may also specify permissions on his documents to restrict the access of his co-workers. Further, the user may search for related documents in the web portal, which typically provide content-based keyword search capabilities. As a result, even though search capabilities are provided, relying on users to proactively search and link related documents may prevent document relationships from being formed systematically.

Example embodiments disclosed herein provide smart content feeds of related content that are linked to the source documents of the related content. For example, in some embodiments, a server computing device searches (e.g., keyword search, selected content search, etc.) in a document repository for related content to be included a target document, where the related content is displayed for approval by a user. In response to an approval, the server computing device maintains reference data describing the source document that originally provided the related content. When the related content in the source document is modified by a user, the server computing devices provides a notification describing the modification to a user computing device accessing the target document. Based on the notification, the user computing device may update the related content in the document to match any modifications made in the source document.

In this manner, example embodiments disclosed herein simplify the maintenance of relationships between related documents in a document repository. Specifically, by maintaining reference data for related content, notifications of source document modifications may be provided to users of target documents that include the related content.

Figure 1:
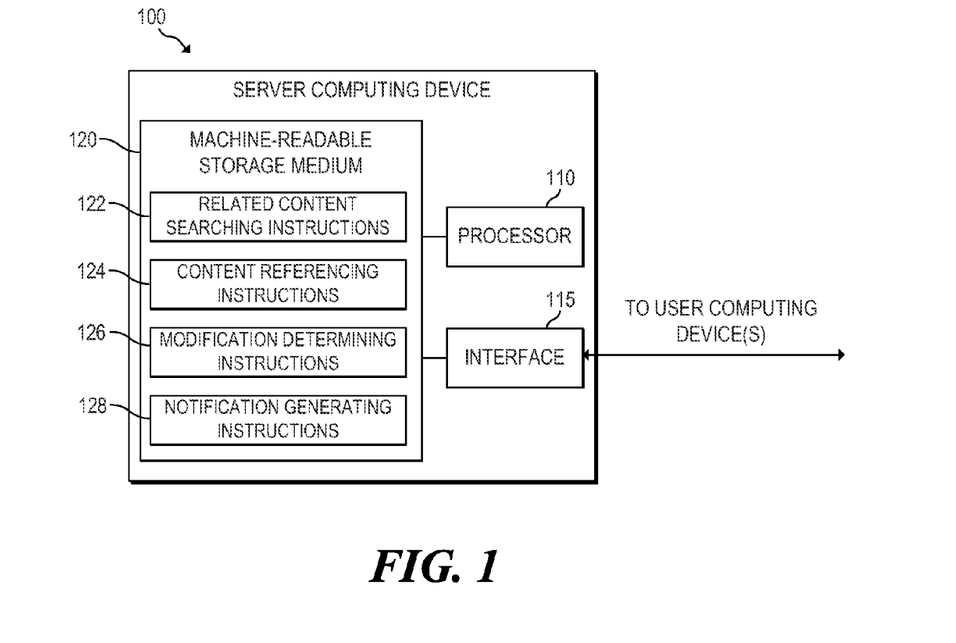
FIG. 1 is a block diagram of an example server computing device for providing smart content feeds for document collaboration.

Referring now to the drawings, FIG. 1 is a block diagram of an example server computing device 100 for providing smart content feeds for document collaboration. Server computing device 100 may be any computing device accessible to a user computing device, such as user computing device 200 of FIG. 2. In the embodiment of FIG. 1, server computing device 100 includes a processor 110, an interface 115, and a machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 122, 124, 126, 128 to enable smart content feeds for document collaboration, as described below. As an alternative or in addition to retrieving and executing instructions, processor 110 may include one or more electronic circuits comprising a number of electronic components for performing the functionality of one or more of instructions 122, 124, 126, 128.

Interface 115 may include a number of electronic components for communicating with a user computing device. For example, interface 115 may be an Ethernet interface, a Universal Serial Bus (USB) interface, an IEEE 1394 (Firewire) interface, an external Serial Advanced Technology Attachment (eSATA) interface, or any other physical connection interface suitable for communication with the user computing device. Alternatively, interface 115 may be a wireless interface, such as a wireless local area network (WLAN) interface or a near-field communication (NFC) interface. In operation, as detailed below, interface 115 may be used to send and receive data, such as reference data, document data, and documents, to and from a corresponding interface of a user computing device.

Machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for smart content feeds for document collaboration.

Related content searching instructions 122 may search source documents in a document repository for related content to be included in a target document. For example, a keyword search may be performed based on parameters provided by a user to identify related content in the document repository. In this example, related content search instructions 122 may provide the identified related content to a user computing device through the interface 115, where the related content is reviewed by the user. In response to the identified related content, the user may approve related content to be included in the target document.

A document may be stored as a computer file that includes editable text such as a spreadsheet, a word processing document, a presentation, etc. The document may be configured to be edited by a document editing application such as a spreadsheet application, a word processor, a presentation designer, etc. The document editing application may provide an advanced programming interface (API) that allows third party applications (e.g., document management system) to interact with an open document. Alternatively, the document editing application may be a custom application that tracks references to source documents from target documents. In this case, the document editing application may be used to review the status of related content from source documents so that the user may identify target documents that should be reviewed for possible updates.

Content referencing instructions 124 may create a reference data entry in a content reference database for related content that is included in a target document as a smart content feed. The reference data entry may include the location of the source document that originally included the related content, a timestamp for when the related content was copied from the source document, a copy of the related content, parameters used to search for the related content, and, if the source document is structured, a section identifier associate with a section within the source document that includes the related content. The reference data entry may be created in response to an approval to include the related content in the target document that is received from a user computing device.

A structured document may be divided into sections that are defined by formatting data of the structured document. For example, a structured document may include a section break between each section, where each section begins with a heading. In another example, a structured document may include section breaks that are defined by outline formatting.

Modification determining instructions 126 may use a reference data entry to determine whether a source document that is referenced by a target document currently being edited has been modified. For example, modification determining instructions 126 may compare the timestamp in the reference data entry to a last modified timestamp (i.e., when the source document was last modified) of the source document. In this example, if the last modified timestamp is more recent than the timestamp from the reference data entry, it may be determined that the source document has been modified. If it is determined that the source document has been modified, modification determining instructions 126 may then search the source document for the original related content. If the original related content is still in the source document, then the modifications did not affect the related content. If the original related content no longer exists in the source document, then the modifications did affect the related content and modification determining instructions 126 may initiate notification generating instructions 128 as described below.

Notification generating instructions 128 may generate a notification describing the modification of a source document. If the source document is a structured document, the notification may include modified related content that is located in the modified source document using the section identifier from the reference data entry. In this case, the notification may also be configured to allow the user computing device to incorporate the modified related content into the target document. If the source document is an unstructured document, the notification may simply state that the source document has been modified and recommend that the user review the modifications.

In some cases, a target document may refer to related content in multiple source documents. Similarly, a source document may be referred to in multiple target documents. For a target document with multiple references, the related content from multiple source documents may be processed iteratively as discussed above for each source document when the target document is accessed. For a source document that is referred to by multiple target documents, the related content may be processed as discussed above as each of the source documents is accessed.

Figure 2:
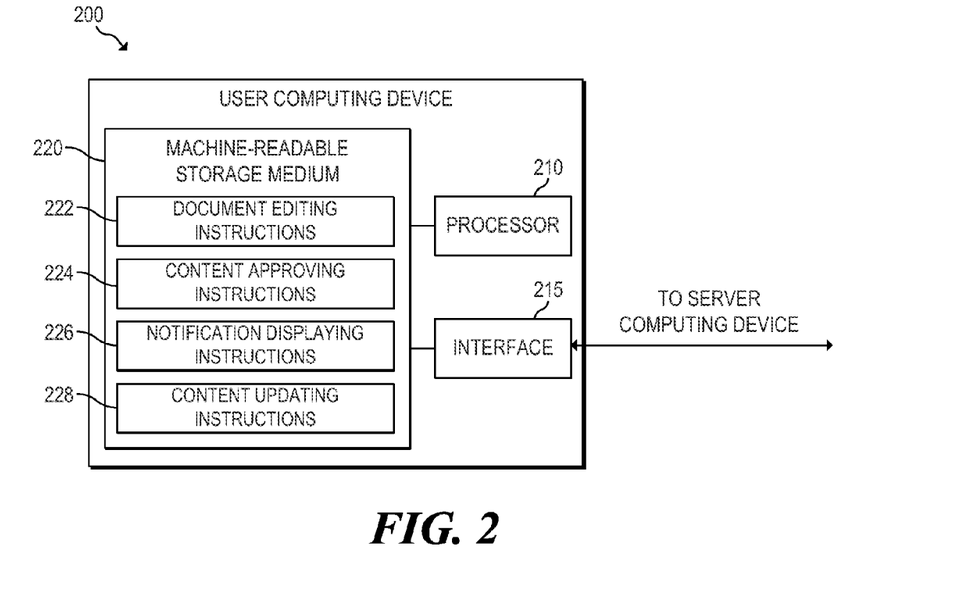
FIG. 2 is a block diagram of an example user computing device for displaying smart content feeds for document collaboration.

FIG. 2 is a block diagram of an example user computing device 200 for displaying smart content feeds for document collaboration facilitated by a server computing device. User computing device 200 may be, for example, a notebook computer, a desktop computer, an all-in-one system, a thin client, a workstation, a tablet computing device, a mobile phone, or any other computing device suitable for execution of the functionality described below. In the embodiment of FIG. 2, user computing device 200 includes processor 210, interface 215, and machine-readable storage medium 220.

As with processor 110 of FIG. 1, processor 210 may be one or more CPUs, microprocessors, and/or other hardware devices suitable for retrieval and execution of instructions. Processor 210 may fetch, decode, and execute instructions 222, 224, 226, 228 to implement the display of smart content feeds for document collaboration described below. Processor 210 may also or instead include electronic circuitry for performing the functionality of one or more instructions 222, 224, 226, 228. As with interface 115 of FIG. 1, interface 215 may include electronic components for wired or wireless communication with server computing device. As described above, interface 215 may be in communication with a corresponding interface of server computing device to send or receive reference data, related content, or documents. As with storage medium 120 of FIG. 1, machine-readable storage medium 220 may be any physical storage device that stores executable instructions.

Document editing instructions 222 may provide a document editing application for reviewing a target document. The target document may be stored as a computer file that includes editable text, where the text is modified by the user in the document editing application. The document editing application may allow the user to initiate a search to identify related content for including in the target document. For example, the user may select a portion of the target document as a parameter and then send the parameter in a search request to a server computing device to initiate the related content search. In another example, the user may manually specify keywords in the search request that are used as parameters in the related content search. In some cases, the user may also specify the document repositories that should be searched in the related content search. The document repositories may be specified in the search request using repository identifiers.

Alternatively, document editing instructions 222 may a custom application that tracks references to source documents from target documents. In this case, the custom application may be used to review the status of related content referred to from source documents, thereby allowing the user to identify target documents that should be reviewed for possible updates.

Content approving instructions 224 may allow a user to select related content obtained by the server computing device from a related content search. Specifically, content approving instructions 224 may display the related content in the document editing application so that the user may approve or disapprove the content. If the user approves the related content, content approving instructions 224 may add the related content to the target document as a smart content feed and notify the server computing device of the approval. Alternatively, if the user does not wish to include a complete copy of the related content in the target document, a reference (e.g., endnote, footnote, etc.) may be added to the target document, where the user may paraphrase or use a portion of the related content in the target document. In either case, the server computing device may then generate a reference data entry as discussed with respect to FIGS. 1 and 4A.

The smart content feed may be a designated portion of the target document that includes the related content. For example, the smart content feed may include reference data describing the source document of the related content included in the smart content feed. In this example, when a target document is opened in a document editing application, each of the smart content feeds may be processed to determine if the corresponding related content has been updated in the source document. In other cases, the smart content feed may include a reference (e.g., endnote, footnote, etc.) to the related content in the source document, where the smart content feed displays a summary or a portion of the related content as designated by the user.

Notification displaying instructions 226 may display information based on notifications received from the server computing device in the document editing application. As discussed above, if the source document is a structured document, a notification may include modified related content, which was modified in the source document and then detected by the server computing device. In this case, notification displaying instructions 226 may display the modified related content in the document editing application. If the source document is an unstructured document, notification displaying instructions 226 may allow the user to view the entire modified source document to determine if the related content should be updated in the target document.

Content updating instructions 228 may update related content in the target document based on feedback from the user. For example, if the user approves modified related content from a structured document, content updating instructions 228 may replace the related content in the smart content feed of the target document with the modified related content. In another example, content updating instructions 228 may replace the related content in the smart content feed with new related content in response to the user approving the new related content from an unstructured document. In either example, content updating instructions 228 may then notify the server computing device of the updates to the related content in the target document.

Figure 3:
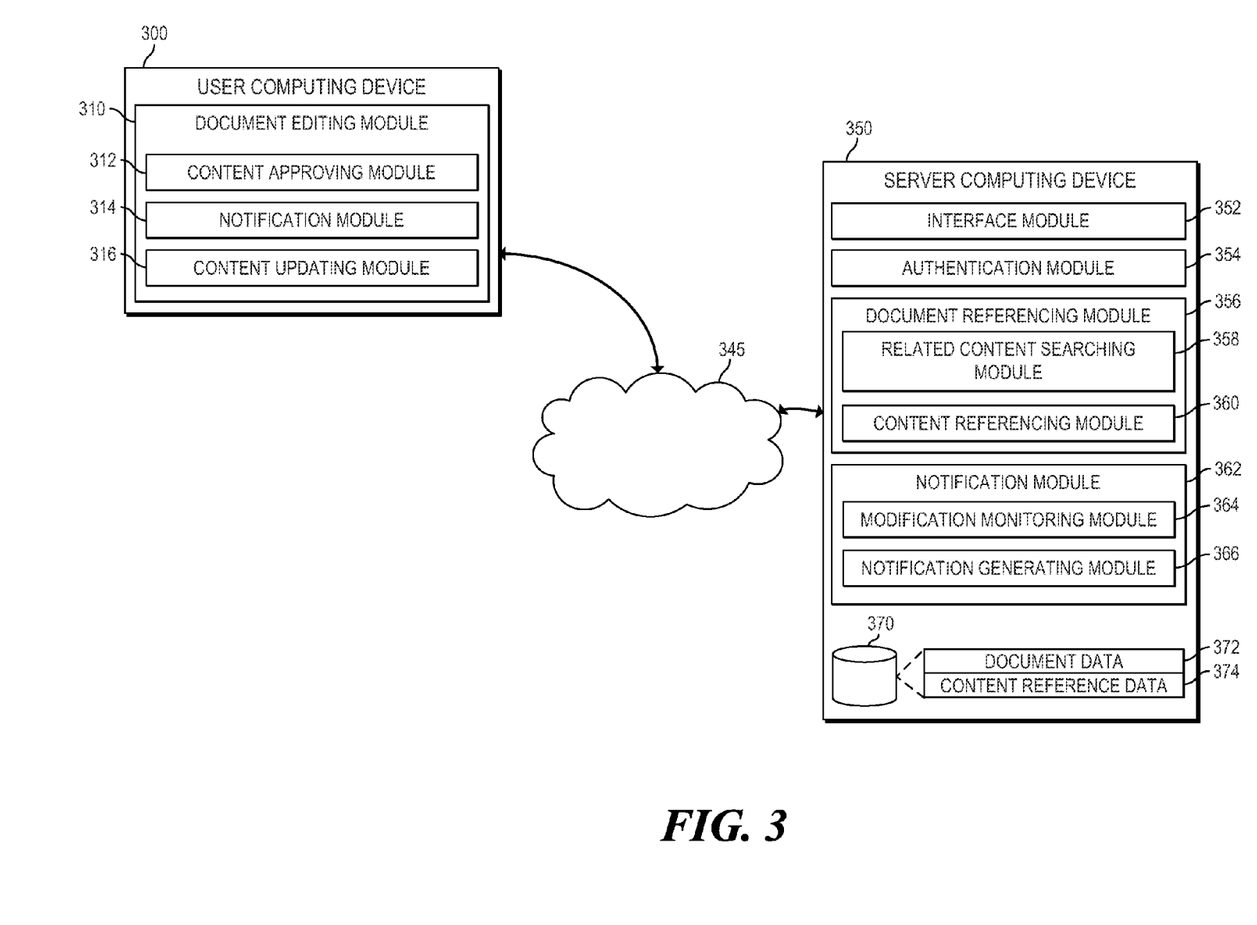
FIG. 3 is a block diagram of an example server computing device in communication with a user computing device for providing smart content feeds for document collaboration.

FIG. 3 is a block diagram of an example server computing device 350 in communication via a network 345 with a user computing device 300. As illustrated in FIG. 3 and described below, server computing device 350 may communicate with user computing device 300 to provide smart content feeds for document collaboration.

As illustrated, user computing device 300 may include a number of modules 310-316, while server computing device 350 may include a number of modules 352-366. Each of the modules may include a series of instructions encoded on a machine-readable storage medium and executable by a processor of the respective device 300, 350. In addition or as an alternative, each module may include one or more hardware devices including electronic circuitry for implementing the functionality described below.

As with user computing device 200 of FIG. 2, user computing device 300 may be a notebook, desktop, tablet, workstation, mobile device, or any other device suitable for executing the functionality described below. As detailed below, user computing device 300 may include a series of modules 310-316 for enabling the display of smart content feeds.

Document editing module 310 may provide a user with access to document collaboration services provided by the server computing device 350. Although the components of document editing module 310 are described in detail below, additional details regarding an example implementation of module 310 are provided above in connection with instructions 222-228 of FIG. 2.

Content approving module 312 may allow the user to approve related content provided by the server computing device 350. Specifically, content approving module 312 may collect parameters for a related content search from the user and then display the results of the related content search for approval by the user. The parameters may be, for example, user-specified keywords or a selection of a portion of the target document. For example, content approving module 312 may display recommendations for related content to be included in a target document, where the recommendations are provided by server computing device 350. In this example, in response to a user approving a recommendation of related content, the content approving module 312 may add the related content to the target document as a smart content feed. Content approving module 312 may be implemented as an extension of a document editing application (e.g., spreadsheet editor, work processor, etc.). In this case, content approving module 312 may use an API of the document editing application to provide the functionality described above. Further details regarding an example implementation of content approving module 312 are provided above in connection with document editing instructions 222 and content approving instructions 224 of FIG. 2.

Notification module 314 may process notifications from server computing device 350 to display reference data associated with related content. For example, a notification from server computing device 350 may describe modifications of a source document that originally included the related content. In this example, notification module 314 may display a description of the modification such as modified related content from a structured document. Notification module 314 may also allow the user to approve or disapprove modified related content to be included in the target document. Further details regarding an example implementation of notification module 314 are provided above in connection with notification displaying instructions 226 of FIG. 2.

Content updating module 316 may update related content included in a target document based on feedback from the user. Feedback from the user may include (1) approval of modified related content received in a notification from server computing device 350; (2) a request to unlink related content from a source document; and (3) selection of new content from a source document. Content updating module 316 may update a corresponding smart content feed with the modified or new content specified in the feedback from the user. Further details regarding an example implementation of content updating module 316 are provided above in connection with content updating instructions 228 of FIG. 2.

As with server 100 of FIG. 1, server computing device 350 may be any server accessible to user computing device 300 over a network 345 that is suitable for executing the functionality described below. As detailed below, server computing device 350 may include a series of modules 352-366 for providing smart content feeds for document collaboration.

Interface module 352 may manage communications with the user computing device 300. Specifically, the interface module 352 may initiate connections with the user computing device 300 and then send or receive smart feed data to the user computing device 300. Interface module 352 may also process login credentials of a user to authorize access by the user computing device 300 to the server computing device 350. Specifically, the interface may first request login information from the user and, upon receipt of the login information, request that authentication module 354 determine whether the user is properly authenticated. If the user is properly authenticated, interface module 352 may then present an additional interface that allows the user to access document collaboration services provided by the server computing device 350.

Document referencing module 356 may manage the process of performing related content searches for document collaboration. Although the components of document referencing module 356 are described in detail below, additional details regarding an example implementation of document referencing module 356 are provided above in connection with related content searching instructions 122 and content referencing instructions 124 of FIG. 1.

Related content searching module 358 may search for related content in response to a search request for related content received from user computing device 300. The related content searching module 358 may use keywordparameters provided by user computing device 300 to search document data 372 (i.e., document repository) stored in storage device 370 for related content. For example, if user computing device 300 provides the user-specified keywords "company vision," a related content search may be performed to identify related content that is associated with the company's vision. In another example, the user of user computing device 300 may select a portion of the target document to be used in a related content search to identify similar content. The results of the related content search may be provided to user computing device 300 for approval by a user.

Content referencing module 360 may maintain reference data entries for related content included in target documents for user computing device 300. Specifically, content reference module 360 may create a reference data entry in content reference data 374 that includes a location of the source document, a timestamp of when the related content was copied, a copy of the related content, parameters used to search for the related content, and, if the source document is a structured document, a section identifier associated with a section including the related content in the source document. For example, in response to a user approving related content at the user computing device 300, a reference data entry may be created for the related content included in the target document. In another example, the reference data entry may be updated in response to the user updating the related content based on, for example, notifications provided by the notification module 362 as discussed below. A target document may include related content from multiple source documents, where a referenced data entry is maintained for related content from each of the source documents.

Content referencing module 360 may also maintain source data entries for tags associated with sections of source documents. For example, the user may specify tags (e.g., descriptive keywords) for a section of a source document using the document editing module 310. In this example, content referencing module 360 may create a source data entry in document data 372 that includes the tags. The tags may then be used by the related content searching module 358 to identify potential related content.

Notification module 362 may manage the process for generating notifications that describe modifications of source documents. Although the components of notification module 362 are described in detail below, additional details regarding an example implementation of notification module 362 are provided above in connection with modification determining instructions 126 and notification generating instructions 128 of FIG. 1.

Modification monitoring module 364 may determine whether source documents that originally included related content have been modified. For example, modification monitoring module 364 may compare a timestamp in a reference data entry to a last modified timestamp of a corresponding source document. If the last modified timestamp is more recent than the timestamp in the reference data entry, modification monitoring module 364 may then search the source document to determine whether the related content is still included in the source document. If the related content is no longer included in the source document, modification monitoring module 364 may request that the notification generating module 366 generate a notification describing the modification of the source document.

Notification generating module 366 may generate notifications that describe modifications of source documents. For example, if the related content in a source document is modified, a notification including the modified related content may be generated and provided to user computing device 300. In this example, the modified related content may be located by searching the source document for content that is similar to the related content. Alternatively, the modified content may be located in a section of the source document that is identified by a section identifier in a corresponding reference data entry. In another example, the notification may simply state that the source document has been modified and include a copy of the source document for review on the user computing device 300. In either case, user computing device 300 notifies notification generating module 366 of the approval or disapproval of the modified related content. In response to the approval or disapproval of the modified related content, notification generating module 366 may instruct content referencing module 360 to update the corresponding reference data entry accordingly.

Storage device 370 may be any hardware storage device for maintaining data accessible to server computing device 350. For example, storage device 370 may include one or more hard disk drives, solid state drives, tape drives, and/or any other storage devices. The storage devices may be located in server computing device 350 and/or in another device in communication with server computing device 350. As detailed above, storage device 370 may maintain document data 372 and content reference data 374.

Figure 4A:
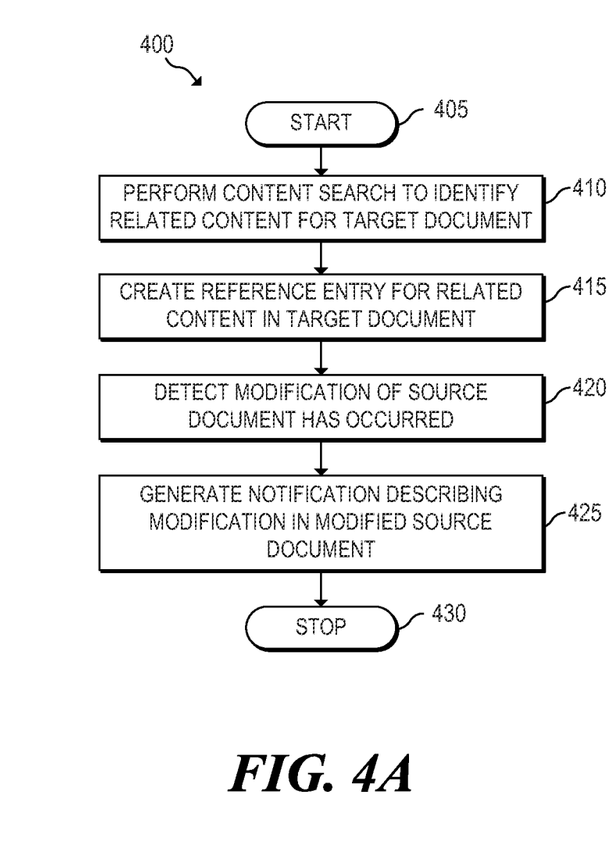
FIG. 4A is a flowchart of an example method for execution by a server computing device for providing smart content feeds for document collaboration.

FIG. 4A is a flowchart of an example method 400 for execution by a server computing device 100 for providing smart content feeds for document collaboration to a user computing device. Although execution of method 400 is described below with reference to server computing device 100 of FIG. 1, other suitable devices for execution of method 400 may be used, such as server computing device 350 of FIG. 3. Method 400 may be implemented in the form of executable instructions stored on a machine-readable storage medium, such as storage medium 120, and/or in the form of electronic circuitry.

Method 400 may start in block 405 and continue to block 410, where server computing device 100 may perform a content search in a document repository to identify related content for including in a target document. For example, a user viewing the target document in a document editing application on a user computing device may send a search request for related content to the server computing device 100. In this example, server computing device 100 may perform the content search based on the search request, which may include search parameters specified by the user. In block 415, server computing device 100 may create a reference data entry for related content added to the target document. Specifically, in response to the user computing device confirming that the related content was approved by the user, server computing device 100 creates the reference data entry with the location of a source document that originally included the related content, a timestamp for when the related content was added to the target document, a copy of the related content, parameters used to search for the related content, and a section identifier associated with a section of the source document that includes the related content.

Next, in block 420, server computing device 100 may determine that a modification of the source document has occurred. For example, when the target document is opened on the user computing device, the reference data entry corresponding to the related content in the target document may be retrieved and used to determine if the source document has been modified since the related content was copied. In block 425, server computing device 100 may generate a notification describing the modification to the source document. Specifically, the notification may include modified related content for approval by the user of the user computing device. If the user approves the modified related content, the target document may be updated to include the modified related content. Method 400 may then continue to block 430, where method 400 may stop.

Figure 4B:
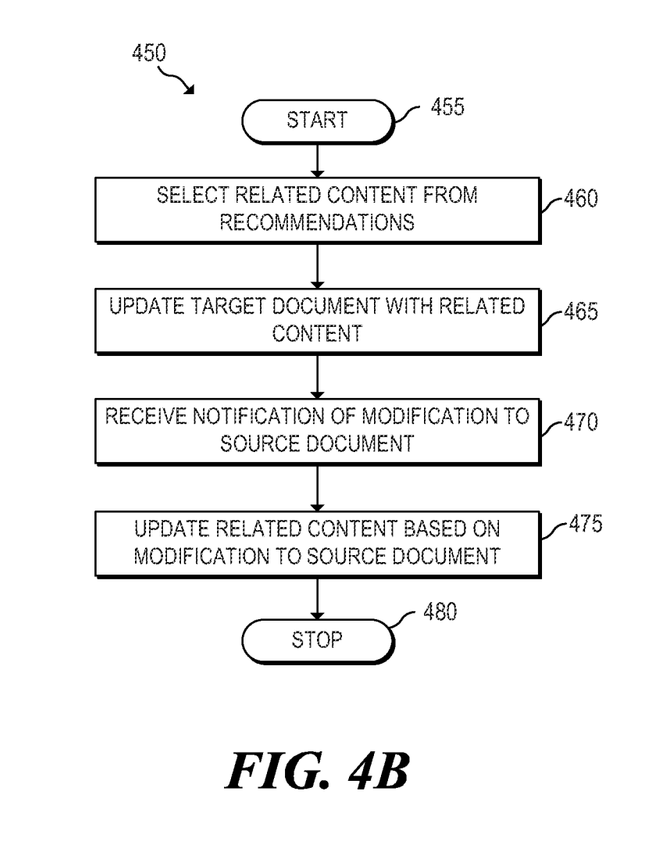
FIG. 4B is a flowchart of an example method for execution by a user computing device for receiving and displaying smart content feeds for document collaboration.

FIG. 4B is a flowchart of an example method 450 for execution by a user computing device 200 for receiving and processing related content notifications from a server computing device. Although execution of method 450 is described below with reference to user computing device 200 of FIG. 2, other suitable devices for execution of method 450 may be used, such as user computing device 300 of FIG. 3. Method 450 may be implemented in the form of executable instructions stored on a machine-readable storage medium, such as storage medium 220, and/or in the form of electronic circuitry.

Method 450 may start in block 455 and proceed to block 460, where user computing device 200 may select related content from recommendations provided by a server computing device. For example, the recommendations may be displayed in-line in a target document being viewed in a document editing application executing on the user computing device 200. In this example, the user may approve the related content that should be added to the target document. Next, in block 465, user computing device 200 my update the target document to include the related content. Specifically, a smart content feed including the related content is added to the target document, and the server computing device may be notified that the related content has been added. Alternatively, a smart content feed including a reference (e.g., endnote, footnote, etc.) to the related content in the source document may be added to the target document. In this case, the smart content feed may also display a summary or a portion of the related content that was prepared by the user when reviewing the related content.

In block 470, user computing device 200 receives a notification from the server computing device that describes a modification of a source document that originally included the related content. The notification may include modified related content for consideration by the user. In response to the user approving the modification, user computing device 200 may update the related content based on the modification of the source document in block 475. In this example, the smart feed in the target document may be updated to include the modified updated content. Method 450 may subsequently proceed to block 480, where method 450 may stop.

In some examples, a target document may include related content from multiple source documents. In this case, the target document may be processed iteratively as discussed above for each of the source documents.

Figure 5:
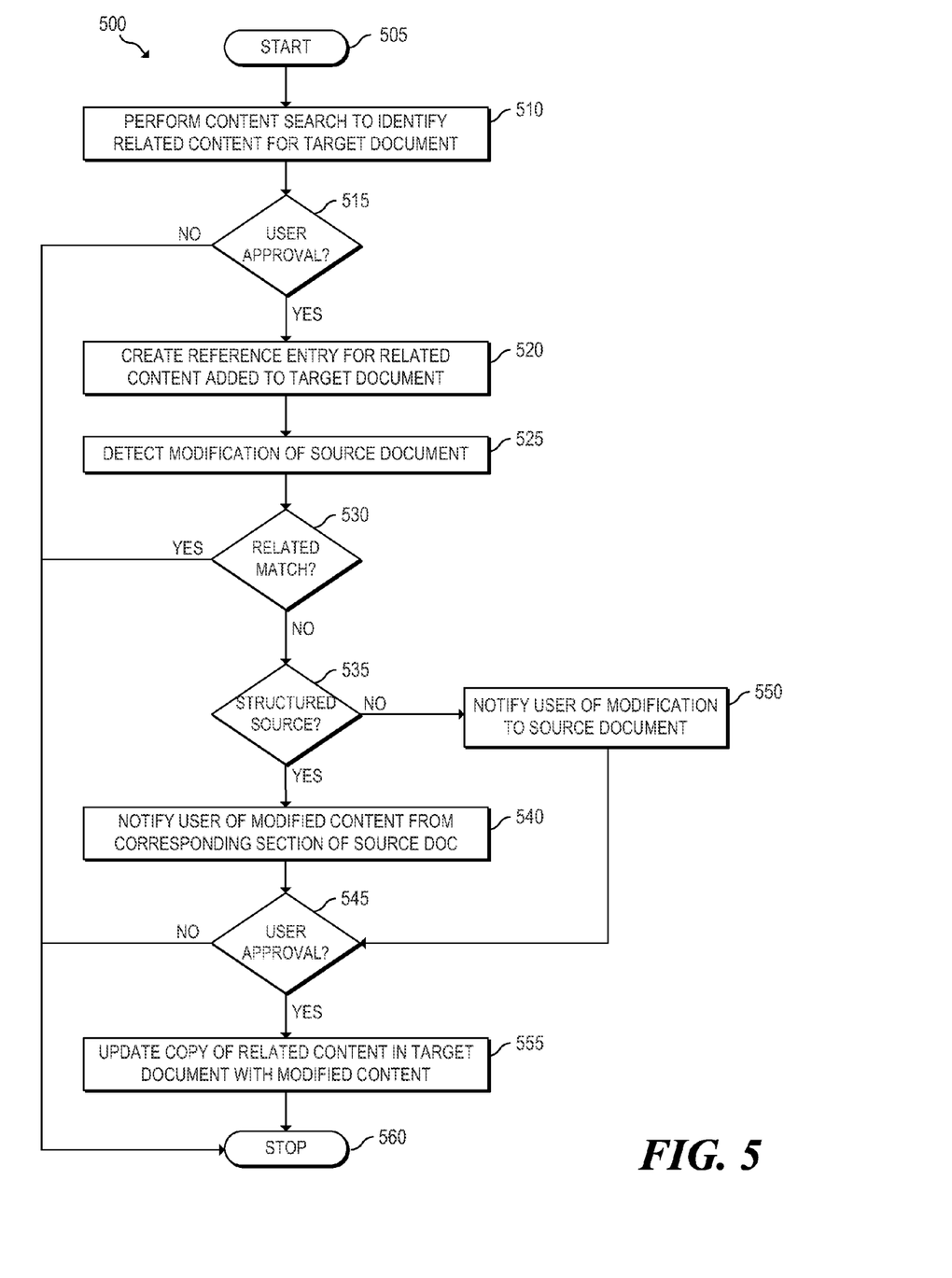
FIG. 5 is a flowchart of an example method for execution by a server computing device for providing smart content feeds for document collaboration.

FIG. 5A is a flowchart of an example method 500 for execution by a server computing device 350 for providing smart content feeds for document collaboration to a user computing device 300. Although execution of method 500 is described below with reference to server computing device 350 of FIG. 3, other suitable devices for execution of method 500 may be used. Method 500 may be implemented in the form of executable instructions stored on a machine-readable storage medium and/or in the form of electronic circuitry.

Method 500 may start in block 505 and proceed to block 510, where server computing device 350 may perform a content search to identify related content for including in a target document. The content search may be in response to a search request from user computing device 300, which is executing a document editing application accessing the target document. In block 515, server computing device 350 may determine if a user approval of the related content has been received from the user computing device 300. If a user approval has not been received, method 500 may proceed to block 560, where method 500 may stop.

If a user approval has been received, method 500 may proceed to block 520, where server computing device 350 may create a reference data entry for the related content that was approved and added to the target document by user computing device 300. After a period of time, server computing device 350 may detect a modification of a source document that originally included the related content in block 525.

In block 530, server computing device 350 may determine if the related content is still included in the source document. If the related content is still included in the source document, method 500 may proceed to block 560, where method 500 may stop. If the related content is no longer included in the source document, server computing device 350 may determine if the source document is a structured document in block 535.

If the source document is a structured document, server computing device 300 may notify user computing device 350 of modified related content obtained from a section of the source document in block 540. If the source document is an unstructured document, server computing device 300 may notify user computing device 350 of the modification to the source document.

At this stage in block 545, server computing device 350 may determine if the user has approved the modification that was provided in the notification sent to the user computing device. If the user does not approve the modification, method 500 may proceed to block 560, where method 500 may stop. If the user does approve the modification, the copy of the related content in the smart feed of the target document may be updated with the modified content from the source document in block 555. Method 500 may then proceed to block 560, where method 500 may stop.

In some examples, a target document may include related content from multiple source documents. In this case, the target document may be processed iteratively as discussed above for each of the source documents.

FIGS. 6A-6D are diagrams of an example user interface 600 of a document editing application in which a panel 626 including a target document has been displayed. As depicted, the user interface 600 includes a title bar 605 identifying the target document and a close icon 610 that may be used by the user to exit the application. The user interface 600 also includes menus for three sets of editing tools: a file menu 615, a view menu 620, and an insert menu 625.

Figure 6A:
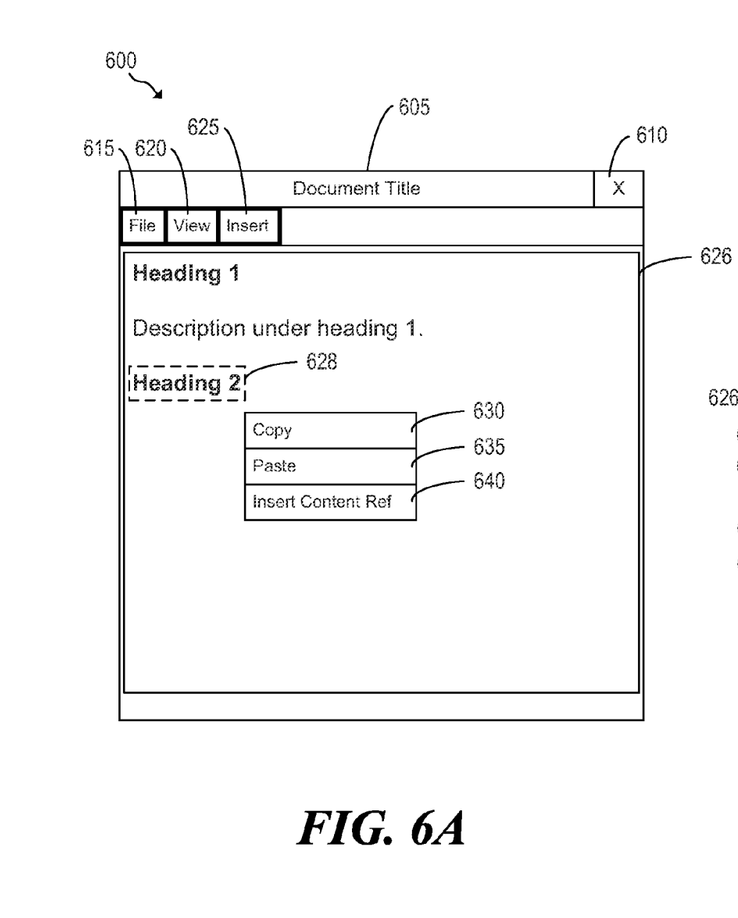
FIGS. 6A-6D are diagrams of an example user interface of a document editing application in which a target document has been displayed.

The user interface 600 has outputted the content of the target document in the panel 626. In FIG. 6A, a user selection 628 of the text "Heading 2" is shown. Further, a context menu has been initiated in the panel 626 showing three functions: a copy function 630, a paste function 635, and an insert content reference function 640. In response to the user selecting the insert content reference function 640, the user interface 600 may be updated as shown in FIG. 6B.

Figure 6B:
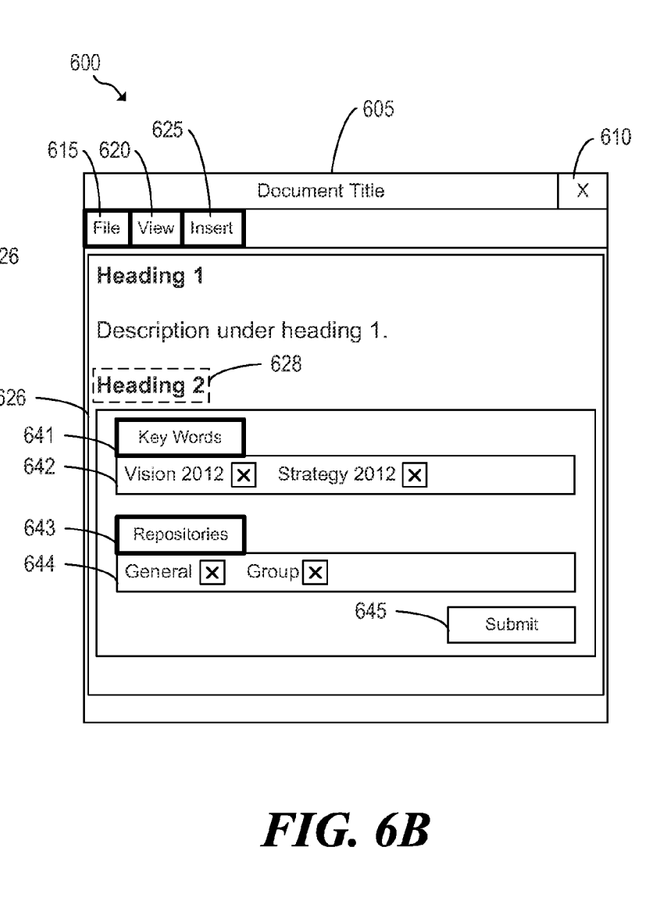

In FIG. 6B, the panel 626 now includes keywords input 641 and repositories input 643. Keywords input 641 is associated with keywords inputbox 642, which includes keywords that are to be used for a related content search. Repositories input 643 is associated with repositories inputbox 644, which includes the document repositories that are to be searched in the related content search. Entries may be added or removed to the keywords inputbox 642 and repositories inputbox 644 by the user. After the user has completed his entries in the inputboxes 642, 644, the submit button 645 may be selected to initiate the related content search.

Figure 6C:
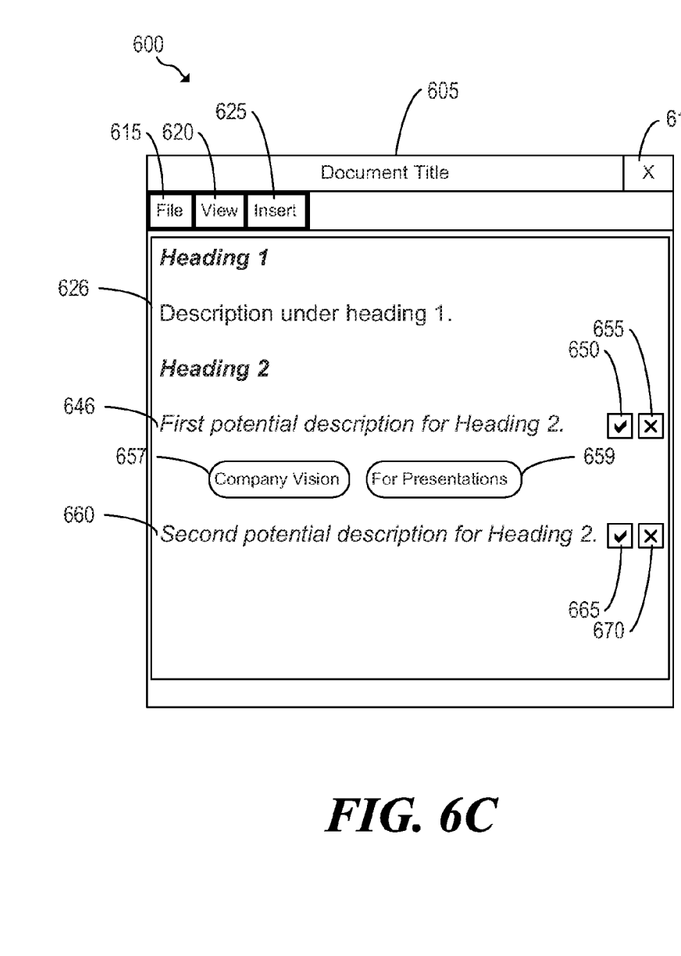

In FIG. 6C, the panel 626 now includes potential related content 646 and potential related content 660. Potential related content 646 is associated with approve button 650 and disapprove button 655. Further, tags 657, 659 associated with the potential related content in a source document as discussed below with respect to FIGS. 7A-7B may be displayed. Similarly, potential related content 660 is associated with approve button 665 and disapprove button 670. If user selects the approve button 650 or the approve button 665, the corresponding potential related content 646, 660 is added to the target document as a smart feed in the panel 626. If user selects the disapprove button 655 or the disapprove button 670, the corresponding potential related content 646, 660 is removed from the panel 626.

Figure 6D:
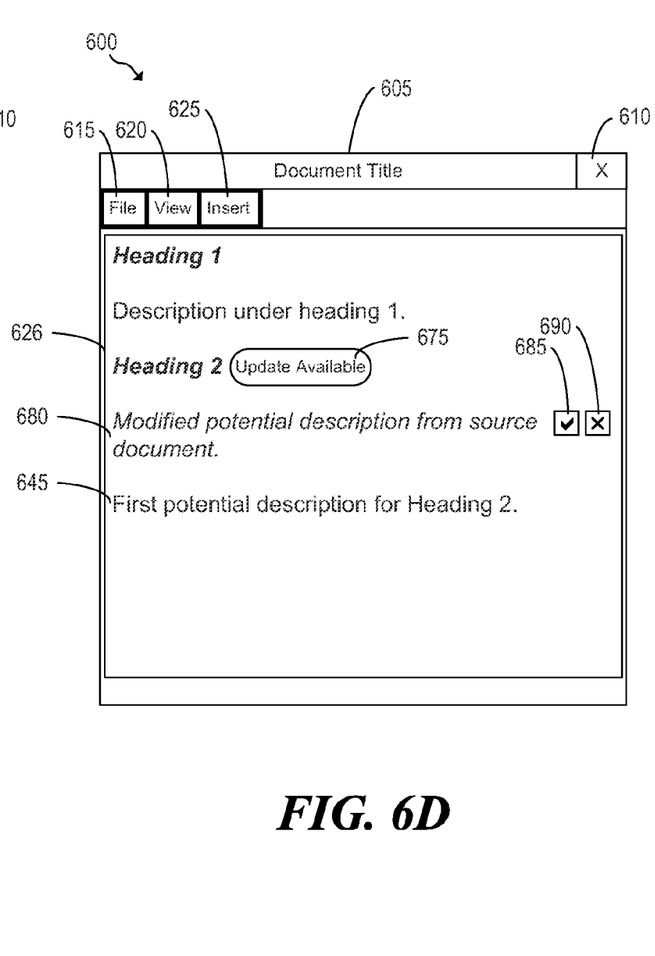

In FIG. 6D, the panel 626 is updated based on a notification describing a modification of a source document that originally included the related content 646. An update label 675 for notifying the user that an update for the related content 646 is available is shown. Modified related content 680 is also shown in the panel 626 above the related content 646. The modified related content 680 is associated with approve button 685, which may be used to replace the related content 646 with the modified related content 680, and disapprove button 690, which may be used to remove the modified related content 680 from the panel 626.

Figure 7A:
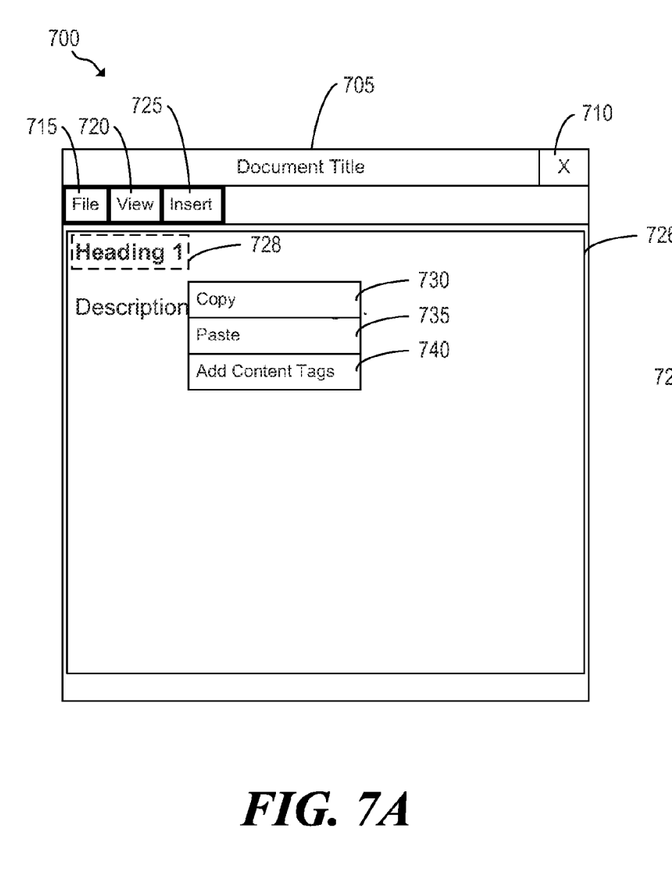
FIGS. 7A-7B are diagrams of an example user interface of a document editing application in which a source document has been displayed.
Figure 7B:
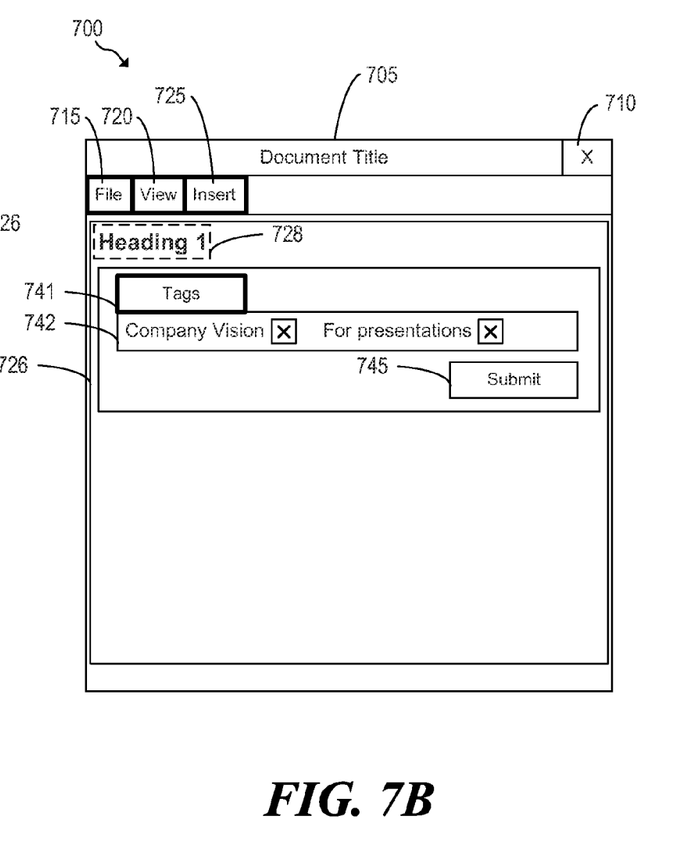

FIGS. 7A-7B are diagrams of an example user interface 700 of a document editing application in which a panel 726 including a source document has been displayed. As depicted, the user interface 700 includes a title bar 705 identifying the source document and a close icon 710 that may be used by the user to exit the application. The user interface 700 also includes menus for three sets of editing tools: a file menu 715, a view menu 720 and an insert menu 725.

The user interface 700 has outputted the content of the target document in the panel 726. In FIG. 7A, a user selection 728 of the text "Heading 1" is shown. Further, a context menu has been initiated in the panel 726 showing three functions: a copy function 730, a paste function 735, and an add content tags function 740. In response to the user selecting the add content tags function 740, the user interface 700 may be updated as shown in FIG. 7B.

In FIG. 7B, the panel 726 now includes tags input 741. Tags input 741 is associated with tags inputbox 742, which includes tags that are to be associated with content in the source document. Tags may be added or removed to the tags inputbox 742 by the user. After the user has completed his tags in the tags inputbox 742, the submit button 745 may be selected to associate the tags with a section of the source document. The tags may be used in a related content search to identify potential related content for a target document as discussed above with respect to FIGS. 6A-6D.

The foregoing disclosure describes a number of example embodiments for providing smart content feeds for document collaboration by a server computing device. In this manner, the embodiments disclosed herein enable smart content feeds for document collaboration by maintaining related content references between target documents and source documents and monitoring the source documents for modifications.

We claim:

1. A system for providing smart content feeds for document collaboration, the system comprising:
a processor to:
search a document repository to identify related content for adding to a target document;
in response to a user approving the related content, create a reference data entry for the related content added to the target document, wherein the reference data entry comprises a timestamp, a section identifier associated with a document section that includes the related content, and a storage location of a source document that includes the related content;
use the timestamp to detect that a modification of the source document has created a modified source document;
in response to determining that the source document is a structured document, use the section identifier to obtain updated related content from the document section of the source document;
generate a notification for the user that describes the modification in the modified source document, wherein the notification comprises the updated related content from the document section; and
in response to the user confirming the updated related content, update the reference data entry in the target document to refer to the updated related content from the source document.

2. The system of claim 1, wherein the processor is further to:
  determine that the related content does not match the updated related content in the document section, wherein the notification is generated in response to determining that the related content does not match.

3. The system of claim 1, wherein the source document is one of a plurality of source documents, wherein the reference data entry further comprises keywords used to search the document repository to identify corresponding related content in each of the plurality of source documents, and wherein the processor is further to:
  in response to a user approving the corresponding related content, create a corresponding reference data entry for the corresponding related content added to the target document; and
  monitor the plurality of source documents for modifications.

4. The system of claim 1, wherein the processor is further to:
  receive a search request comprising keywords specified by the user, wherein the search of the document repository is performed by comparing the keywords to tags associated with the source document in the document repository.

5. A method for providing smart content feeds on a computing device, the method comprising:
  displaying, by the computing device, related content for adding to a target document, wherein the related content was identified from a document repository storing a plurality of source documents;
  in response to a user approving the related content, sending a confirmation that the related content was added to the target document;
  receiving a notification describing a modification to a source document of the plurality of source documents that originally included the related content, wherein the notification comprises updated related content from a document section of the source document, and wherein the updated related content is obtained from the document section using a section identifier in response to determining that the source document is a structured document; and
  in response to the user confirming the updated related content, replacing the related content in the target document with the updated related content from the source document.

6. The method of claim 5, wherein the method further comprises:
  displaying the notification in-line in a document editing application accessing the target document on the computing device, wherein the updated related content is displayed for approval by the user.

7. The method of claim 5, further comprising:
  sending a search request comprising keywords specified by the user, wherein the search of the document repository is performed by comparing the keywords to tags associated with the source document in the document repository.

8. The method of claim 7, wherein the search request further comprises a repository identifier, and wherein the document repository is identified to be searched using the repository identifier.

9. A non-transitory machine-readable storage medium encoded with instructions executable by a processor, the machine-readable storage medium comprising:
  instructions to search a document repository to identify related content for adding to a target document;
  instructions to create, in response to a user approving the related content, a reference data entry for the related content added to the target document, wherein the reference data entry comprises a timestamp, a section identifier associated with a document section that includes the related content, and a storage location of a source document that includes the related content;
  instructions to use the timestamp to detect that a modification of the source document has created a modified source document;
  instructions to user, in response to determining that the source document is a structured document, the section identifier to obtain updated related content from the document section of the source document;
  instructions to generate a notification for the user that includes modified related content from the modified source document, wherein the notification comprises updated related content from the document section; and
  instructions to update, in response to the user confirming the updated related content, the referenced data entry of the target document to refer to the updated related content from the source document.

10. The machine-readable storage medium of claim 9, wherein the machine-readable storage medium further comprises:
  instructions to determine that the related content does not match the updated related content in the document section, wherein the notification is generated in response to determining that the related content does not match.

11. The machine-readable storage medium of claim 9, wherein the source document is one of a plurality of source documents, wherein the reference data entry further comprises keywords used to search the document repository to identify corresponding related content in each of the plurality of source documents, and wherein the machine-readable storage medium further comprises:
  instructions to create, in response to a user approving the corresponding related content, a corresponding reference data entry for the corresponding related content added to the target document; and
  instructions to monitor the plurality of source documents for modifications.

12. The machine-readable storage medium of claim 9, further comprising:
  instructions to receive a search request comprising keywords specified by the user, wherein the search of the document repository is performed by comparing the keywords to tags associated with the source document in the document repository.

* * * * *